US012483386B2

(12) United States Patent
Schvey et al.

(10) Patent No.: US 12,483,386 B2
(45) Date of Patent: *Nov. 25, 2025

(54) PRUNING ENTRIES IN TAMPER-EVIDENT DATA STORES

(71) Applicant: Schvey, Inc., New York, NY (US)

(72) Inventors: Jeffrey Schvey, New York, NY (US); George Rabanca, New York, NY (US); Joby Thundil, New York, NY (US); Josh Dillon, New York, NY (US)

(73) Assignee: Schvey, Inc., New York, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/657,673

(22) Filed: May 7, 2024

(65) Prior Publication Data

US 2024/0364499 A1    Oct. 31, 2024

Related U.S. Application Data

(63) Continuation of application No. 17/033,459, filed on Sep. 25, 2020, now Pat. No. 12,010,213.

(60) Provisional application No. 62/907,271, filed on Sep. 27, 2019.

(51) Int. Cl.
*G06F 9/46* (2006.01)
*G06F 9/455* (2018.01)
*G06F 16/901* (2019.01)
*H04L 9/06* (2006.01)
*H04L 9/00* (2022.01)

(52) U.S. Cl.
CPC ........ *H04L 9/0643* (2013.01); *G06F 9/45508* (2013.01); *G06F 9/466* (2013.01); *G06F 16/9024* (2019.01); *H04L 9/50* (2022.05)

(58) Field of Classification Search
CPC ..... H04L 9/0643; H04L 9/50; G06F 16/9024; G06F 9/45508; G06F 9/466
See application file for complete search history.

(56) References Cited

U.S. PATENT DOCUMENTS

| 11,405,204 B2 * | 8/2022 | Maurer | H04L 9/30 |
| 2020/0228316 A1 * | 7/2020 | Cahill | H04L 9/3297 |
| 2021/0019295 A1 * | 1/2021 | Attarde | G06F 16/2282 |
| 2021/0026985 A1 * | 1/2021 | Rind | G06F 21/6263 |

OTHER PUBLICATIONS

H. Guo, H. L. Victor, E. Paquet, Pruning Relations for Substructure Discovery of Multi-relational Databases. In Lecture Notes in Computer Science, Springer, Berlin, Heidelberg, v.4702, pp. 462-470. (Year: 2007).*

* cited by examiner

*Primary Examiner* — Trang T Doan
*Assistant Examiner* — Vladimir I Gavrilenko
(74) *Attorney, Agent, or Firm* — Pillsbury Winthrop Shaw Pittman LLP

(57) ABSTRACT

Provided is a process that includes pruning entries in a tamper-evident data store while maintaining tamper-evident properties of prior and subsequent entries after pruning. Operations include traversing a linked list of instances of program state of a smart contract in the tamper-evident data store and pruning identified instances of program state in the tamper-evident data store.

20 Claims, 7 Drawing Sheets

PRUNING ENTRIES IN TAMPER-EVIDENT DATA STORES

CROSS-REFERENCE TO RELATED APPLICATIONS

This patent application is a continuation of U.S. patent application Ser. No. 17/033,459, filed 25 Sep. 2020, titled PRUNING ENTRIES IN TAMPER-EVIDENT DATA STORES which claims the benefit of U.S. Provisional Patent Applications 62/907,271, filed 27 Sep. 2019, titled PRUNING ENTRIES IN TAMPER-EVIDENT DATA STORES. The entire content of each afore-listed earlier-filed application is hereby incorporated by reference for all purposes.

BACKGROUND

1. Field

The present disclosure relates generally to tamper-evident data stores and, more specifically, to pruning entries in tamper-evident data stores.

2. Description of the Related Art

Tamper-evident data structures are often used to record data in a way that is generally computationally infeasible to subsequently modify without leaving evidence of the modification in the data structure. Often, these data structures associate the recorded data entries with the output of a one-way function based upon those entries. Inconsistency between the output of the one-way function and the entry at some point in the future indicates tampering. Tampering can often be checked by re-calculating the one-way function based on the current version of the entry to determine if the output matches that present in the data structure. If it does not match, tampering is potentially indicated.

One-way functions generally exhibit relatively high computational complexity (e.g. in time complexity or memory complexity) to compute the input given the output (e.g., to reverse the function), but relatively low computational complexity to compute an output from a given input. Generally, such functions are computationally expensive to reverse, typically to the point of not being commercially feasible. For instance, many one-way functions require more than 10-year's computing time with a consumer-grade, state-of-the-art central processing unit to determine an input that results in a predefined output. To further harden the data structure, inputs and outputs of these one-way functions may be chained and combined with various varying values, like timestamps, to amplify the computational complexity required to reverse the computation.

As a result, changes to entries in the tamper-evident data structure results in entries that are internally inconsistent with the outputs of various one-way functions based on those entries. Tampering can generally be detected by an auditor process that re-computes the result of one-way functions based upon the current entry and determines whether the result is consistent with those already present in the data structure. Changes to entries render the tamper-evident data structure internally inconsistent in a way that is computationally infeasible to avoid, e.g., by tailoring the modified entry to produce the same output of a one-way function.

SUMMARY

The following is a non-exhaustive listing of some aspects of the present techniques. These and other aspects are described in the following disclosure.

Some aspects include a process, including: receiving, with a computer system, a request to prune data stored in a tamper-evident data store, wherein: the data includes first program state of a first program at a first time, the first program is one of a plurality of programs having program state stored in the tamper-evident data store, the request uniquely identifies the first program with an identifier that distinguishes the first program from a second program among the plurality of programs, the tamper-evident data store comprises a directed acyclic graph of cryptographic hash pointers, a first subset of the cryptographic hash pointers have cryptographic hash values based on the first program state of the first program at the first time, a second subset of the cryptographic hash pointers have cryptographic hash values based on second program state of the first program at a second time, a third subset of the cryptographic hash pointers have cryptographic hash values based on the first program state of the first program at the first time, the second program state of the first program at the second time, and program state of the second program from before the first time, and the tamper-evident data store comprises or is associated with a record that links the first subset of the cryptographic hash pointers to the second subset of the cryptographic hash pointers; in response to the request, based on the identifier and the record that links the first subset of the cryptographic hash pointers to the second subset of the cryptographic hash pointers, with the computer system, selecting: a first subset of nodes of the directed acyclic graph having first content based on the first program state of the first program at the first time, the hash values of first subset of the cryptographic hash pointers being based on the first content, and a second subset of nodes of the directed acyclic graph having second content based on the first program state of the first program at the first time, the hash values of second subset of the cryptographic hash pointers being based on the second content; pruning, with the computer system, the first program state and the second program state from the tamper-evident data store by changing the first content and the second content in memory, wherein: after the pruning, cryptographic hash values of the directed acyclic graph of cryptographic hash pointers are internally consistent, and after the pruning, program state of second program from before the first time remains in the tamper-evident data store.

Some aspects include a virtual machine having an opcode configured to effectuate pruning of tamper-evident data structures while preserving cryptographic proof of membership status and tamper-evident properties of data in the data structure that pre-dates pruned entries.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
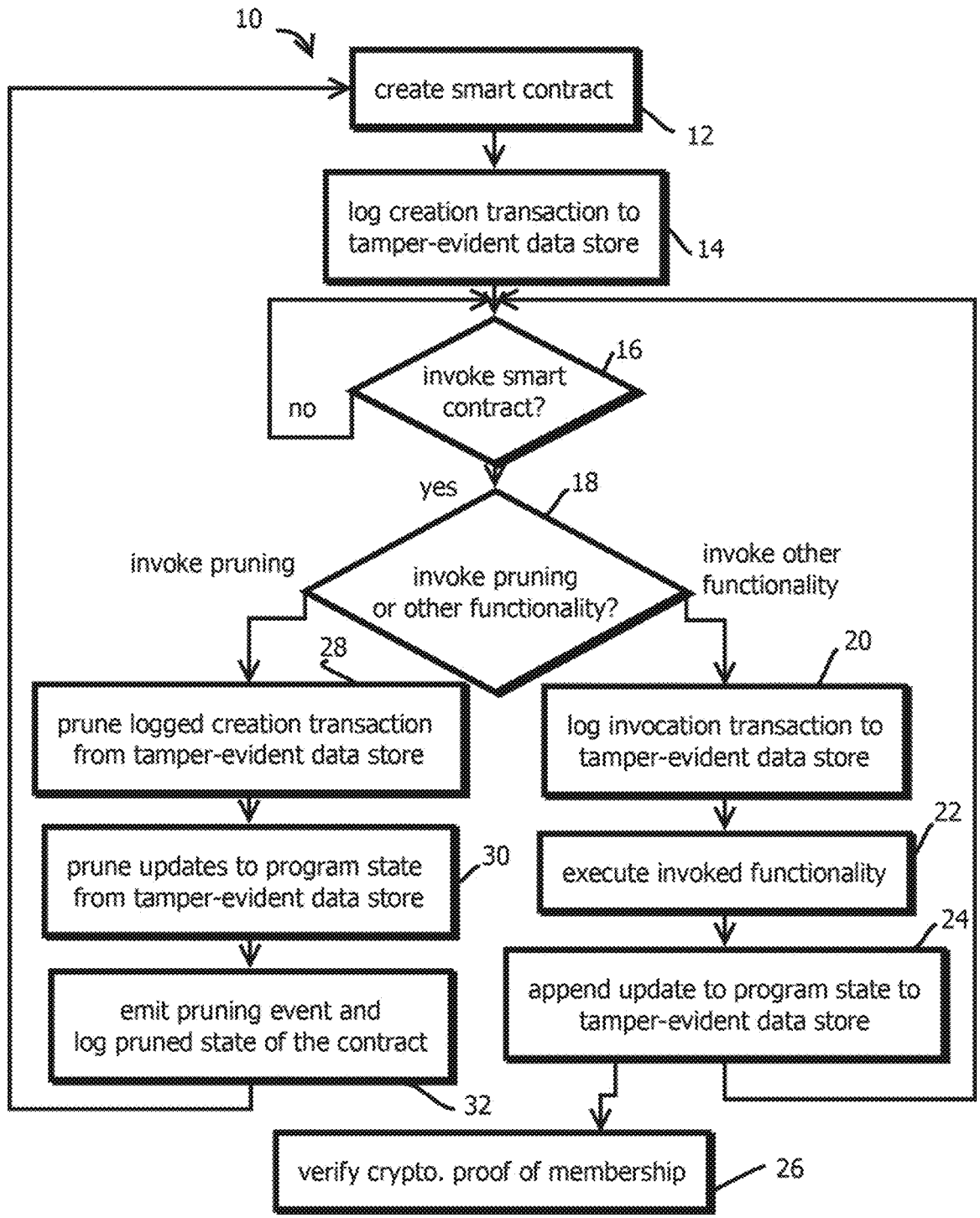
FIG. 1 is a flowchart depicting an example of a process by which program state of a smart contract may evolve, be persisted to a tamper-evident data store, and be pruned, in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of cryptography and decentralized computing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As discussed above, tamper-evident data stores (e.g., repositories rendering data tamper-evident with one or more tamper-evident data structures) afford desirable properties, including making it relatively easy to detect tampering with entries in the data store and making it relatively difficult or impossible to tailor entries to avoid such detection. These affordances, however, can create challenges when deploying tamper-evident data stores in commercial use cases, where users may wish to prune (e.g., overwrite, delete, replace with a null value, de-index or otherwise render inaccessible for purposes of associating with a transaction) certain entries after those entries are committed to the data store. Often erroneous data is entered, for instance, due to human error, software bugs, or various sources of noise, and parties may wish to remove those entries from the tamper-evident data store while maintaining the tamper-evident properties otherwise exhibited by the data store. For instance, an entity may wish to remove one entry while maintaining the ability to detect tampering of earlier and subsequent entries. In other examples, pruning may be motivated by regulations (e.g., General Data Protection Regulation (GDPR)) or after data retention policies have been reached.

Other approaches like truncating a chain of entries to exclude those including the entry and earlier entries typically fail to preserve the earlier entries and thus, are not suitable for some use cases. Other approaches, like storing the data exclusively external to the tamper-evident data store with a one-way function output stored in the data store (like a hash digest), increase latency in data access and can remove the data from the ambit of privacy and access controls implemented in related decentralized computing platforms that store data in the data store. Similarly, approaches like tailoring a replacement entry calculated to produce the same output of the one-way function as the removed entry are generally computationally infeasible due to the properties of one-way functions. Thus, there is a need to be able to prune (e.g., overwrite, delete, replace with a null value, de-index, or otherwise render inaccessible for purposes of associating with a transaction) specific on-chain entries in tamper-evident data stores without losing the ability to retrieve or detect tampering of earlier entries in a computationally feasible manner.

Moreover, it can be difficult to determine which entries in a tamper-evident data structure to prune. An entity may wish to remove all entries associated with a given process, and those entries may be interleaved with entries of one or a plurality of other different processes recorded to the same tamper-evident data structure. For example, a relatively large number of different smart contracts may persist state to the same blockchain. Many blockchain-based computing platforms make it difficult or impossible to identify earlier instances of state of a given smart contract on the block chain once that state has evolved. Thus, even if pruning were supported, there is a need to be able to identify which entries to prune from many commercially-relevant tamper-evident data structures.

Finally, many blockchain-based computing platforms constrain the set of valid operations that can be performed and offer near-Turing complete sets of operations to developers. Often such platforms execute smart contracts and other programs within virtual machines that lack opcodes to delete entries, as the systems were designed such that the written data is to be immutable and, thus, impossible to prune.

None of the preceding should be taken to suggest that any technique is disclaimed or that the approaches described herein may not be used in conjunction with other approaches having these or other described disadvantages, for instance, some embodiments may prune certain entries while truncating entries older than a threshold date that is substantially earlier than pruned entries. Or some embodiments may merely prune current state of a smart contract and leave older records of state of the smart contract unaltered. Or some embodiments may be implemented with a virtual machine that does not support a pruning operation, and pruning may be implemented external to a runtime environment of the virtual machine, e.g., with a program executing on a host computing device.

Some embodiments execute a process described below with reference to FIG. 1 that creates and then prunes entries from tamper-evident data stores (e.g., on-chain entries stored in leaf-nodes of directed acyclic graphs of cryptographic hash pointers), while leaving other entries unaltered and subject to detection in the event of tampering, including entries earlier than those being pruned. In some embodiments, pruning is implemented with the process described below with reference to FIG. 2 on data structures like those described with reference to FIGS. 3A and 3B. In some embodiments, these processes may be executed on logical and physical architectures like those described below with reference to FIG. 4, maintaining data privacy and access controls like those described with reference to FIG. 5, and executing on computing devices like those described with reference to FIG. 6.

In some embodiments, the process 10 of FIG. 1, like the other processes and functionality described herein, may be implemented as computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium." In some embodiments, the operations may be executed in a different order from that described, some operations may be executed multiple times per instance of the process's execution, some operations may be omitted, additional operations may be added, some operations may be executed concurrently and other operations may be executed serially, none of which is to suggest that any other feature described herein is not also amenable to variation.

In some embodiments, the process 10 may execute on a decentralized computing platform operative to persist state to a decentralized tamper-evident data store, like one or more blockchain-based computing platforms or other decentralized applications, like Swarm, Dat, Interplanetary File System, and the like. Examples of such computing platforms include AxCore, Ethereum, Hyperledger (e.g., Sawtooth, Fabric, or Iroha, or the like), Corda, Openchain, Stellar, NEO, Libra, Bitcoin, and EOS. In some embodiments, the decentralized computing platform is a Turing-complete decentralized computing platform operative to execute smart contracts (or other programs) on the computing platform in a decentralized manner with verifiable computing techniques. For instance, computations may be replicated on each of a plurality of (like a randomly or pseudo-randomly selected subset of, or all of) peer nodes of the computing platform, and a consensus may be reached regarding results of the computation, such that a malicious actor is impeded from interfering with results of the computation by peer nodes outside their control.

In some embodiments, the underlying computing hardware may be un-trusted, and various consensus algorithms may be applied to ascertain results of computation and state of the various processes executed thereon in a manner that does not require any one computing device to be trusted.

Some embodiments may execute various consensus algorithms (e.g., Paxos, Raft, Hotstuff, Honey Badger Byzantine Fault Tolerance, Practical Byzantine Fault Tolerance, or Helix). In some cases, a subset of peer nodes may participate in the consensus determination. In some cases, peer nodes may determine respective roles including leader, candidate, and follower, and the devices may determine sequence of changes in roles with a monotonically increasing number, like a term number. At each term number increment, the peer nodes may elect a new leader. Peer nodes, in an election, may send requests to other peer nodes for votes. A majority vote holder may be designated as a leader for the current term increment. Messages between peer nodes may include a term number of the sending peer node, and requests with stale term numbers (relative to a receiving peer node) may be rejected. In some embodiments, the leader node may periodically broadcast heartbeat messages to follower nodes, and follower nodes may trigger elections responsive to determining that a heartbeat message has not been received in a threshold amount of time since a last heartbeat message.

In some embodiments, authority of peer nodes to participate in consensus may be determined in virtue of peer nodes demonstrating some form of proof to other peer nodes. In some embodiments, the proof is proof of work, for instance, by computing a hash collision to some threshold number of digits with a cryptographic hash function, or the proof may be proof of stake or proof of storage, for example. In some embodiments, the proof is of possession of a secret value, like a private key of a cryptographic key pair uses to sign a value (e.g., a pseudorandom challenge) associated with the nodes public key.

In some embodiments, the process 10 includes creating a smart contract, as indicated by block 12. In some embodiments, this may include obtaining a source code version of the smart contract, for example, encoded in a language like Solidity, Java, Scala, Go, or the like, for instance, from a developer. In some embodiments, creating the smart contract may include interpreting the smart contract into bytecode form for a virtual machine of the peer nodes of the decentralized computing platform. Interpreting may include parsing the bytecode, forming an abstract syntax tree representation, and transforming the abstract syntax tree into a bytecode representation by mapping entries in the tree to opcodes (corresponding to bytecodes) (and parameters of such opcodes) of a target runtime environment. In some embodiments, that bytecode may encode various opcodes of the virtual machine, and in some embodiments, some of those opcodes may be pruning opcodes like those described in greater detail below with reference to FIG. 2. The term smart contract is used broadly to refer to both the source code encoding and bytecode encodings or other transformations thereof (e.g., compiled to machine code). For instance, reference to "a smart contract" and "the smart contract" may refer to a source code form of the smart contract and a bytecode form of the smart contact respectively or source code or bytecode instances in both references. The encoding may evolve formats while still bearing the same label.

Smart contracts may be scripts or other types of programs, and smart contracts may include references to local and global state, the latter being shared potentially among multiple smart contracts or other types of programs, and the former being isolated from other smart contracts. In some embodiments, a given smart contract may have subroutines, like methods or functions thereof. In some embodiments, the smart contracts may take arguments, and different methods or functions may take different arguments. In some embodiments, upon execution, the smart contract may persist state to the tamper-evident data store of the decentralized computing platform upon which it executes, as described in greater detail below.

In some embodiments, creating the smart contract may include deploying the smart contract. In some embodiments, the smart contract may be deployed to an address of the decentralized computing platform that uniquely identifies the smart contract and distinguishes it from other smart contracts and other entities, like wallet addresses on the decentralized computing platform or external accounts on other decentralized computing platforms. The address may be an application-layer address in the Open Systems Interconnection model (OSI model). In some embodiments, the address is based on (e.g., a cryptographic hash based on) a public key for an external account, an address of the account that deploys the smart contract, and a nonce (e.g., a counter that is incremented with each deployment).

In some embodiments, the address of the smart contract is explicitly defined by the smart contract itself in a form other than as a hash of an encoding of the smart contract. In some embodiments, the smart contract may be called on the decentralized computing platform by addressing a message (or other transaction) to this address and appending various arguments and identifiers of subroutines being invoked to the extent a subroutine rather than a main function is invoked.

Some embodiments may log a transaction in which the smart contract is created to the tamper-evident data store, as indicated by block 14, e.g., by recording some or all of the information of the transaction. In some embodiments, the log of the transaction may include a cryptographic hash of the code of the smart contract, thereby rendering changes to that code tamper evident, and some embodiments may execute a cryptographic proof of membership (e.g., Merkle proof) of the code to verify the absence of tampering each time the smart contract is invoked. In some embodiments, the decentralized tamper evident data store may include various component tamper-evident data structures, like Merkle trees and tries, as described in greater detail with reference to FIGS. 3A and 3B. Trees may store data in leaf nodes, and tries may store data in nodes along paths to leaf nodes, e.g., with a prefix stored in a first node closer to a root node, an intermediate portion of an entry stored in a next node away from the root node, and a suffix stored in a leaf node that defines the path, while a different suffix of another entry sharing the same prefix and intermediate portion may be stored in other paths passing through the first two nodes of the trie.

In some embodiments, different tries may have root nodes documented in (e.g., stored in, or having a cryptographic hash based on their value stored in) the same block of a chain of blocks in a block chain. In some cases, those different tries may include a state trie, a receipt trie, and a transaction trie. In some embodiments, the transaction that deployed the smart contract may be logged to the transaction trie, for instance, in a set of nodes along a path of the trie, and an entry may be created in the state trie, like in a set of nodes along a path of the trie, corresponding to an address of the smart contract upon invocation of the smart contract. In some embodiments, that entry in the state trie may include a storage root of a storage trie that is specific to the smart contract and stores local state of the smart contract, while the state trie may serve as part of global state of the decentralized computing platform, or the state trie may serve as part of global state of one of the domains or subspaces discussed below with reference to FIG. 5, with different domains or subspaces having different state tries.

In some embodiments, the decentralized computing platform may then wait until the smart contract is invoked, as indicated by decision block 16. In some embodiments, the decentralized computing platform may host a plurality of smart contracts, like more than 5, more than 10, more than 100, or more than 10,000 smart contracts concurrently being hosted. Those smart contracts may be created by more than 2, more than 5, more than 10, more than 100, or more than 1000 different creators of smart contracts.

In some embodiments, state of all of these different programs may be persisted to (e.g., stored in a manner that survives between instances of invocation) the same tamper-evident data store, in some cases in different designated subsets thereof for different subgroups of smart contracts, like according to the domain and subspace architecture described below with reference to FIG. 5. In some embodiments, a given smart contract may be invoked a plurality of different times, like more than 5 or more than 10 by a plurality of different entities each having different addresses on the decentralized computing platform from which they send transactions invoking the smart contract to the address of the smart contract. Different entities and different invocations at different times may invoked different functionality in the smart contract, for instance, different subroutines to evolve state of the smart contract over time. In some cases, each of those transactions may be logged to the transaction trie of a current block of a block chain. The logged transactions may be used to synchronize new peer computing nodes. A late arriving node to the decentralized computing platform may re-create current state of the tamper-evident data store by replaying transactions (e.g., other than those subject to pruning) since the beginning epoch of the tamper-evident data store to arrive at a current version of the tamper-evident data store in local memory that is synchronized with versions stored on other peer nodes. In some embodiments, a late arriving node to the decentralized computing platform may re-create current state of the tamper-evident data store by reconciling state against the root hash of the block without replaying transactions.

In some embodiments, a subset or all of the smart contracts deployed to the decentralized computing platform may include a pruning subroutine. In some embodiments, the pruning subroutine may be explicitly encoded in the smart contract as a subroutine or as branching logic in some other routine that determines whether pruning is to be applied. In some embodiments, the pruning logic may include logic that determines whether the entity that sent the transaction that caused the pruning code to be executed is authorized to cause pruning, for instance, determining whether the transaction sender has demonstrated possession of a private cryptographic key associated with a public cryptographic key documented in the tamper-evident data store as having authority to prune entries in a targeted subspace of a targeted domain (e.g., explicitly or implicitly identified in the transaction invoking the pruning logic) like those described below with reference to FIG. 5. In another example, pruning may be invoked in an error handling subroutine, for instance, with a try-catch design pattern that causes state of smart contracts that otherwise fail to execute to prune their data (or data from current execution instance), as the code of the smart contract itself may determine that entries are erroneous. In some embodiments, pruning may be conditioned, by code of the pruning subroutine, on existence of a multiparty set of signatures, for instance, some embodiments may determine whether transactions requesting pruning have been received by counterparties to a smart contract and, in response to detecting a transaction from the last counterparty in the set, responding by causing the described pruning operations. Some embodiments may invoke pruning responsive to time-based logic, e.g., in response to determining that a given entry, smart contract invocation, or smart contract is older than a threshold age.

In some embodiments, pruning functionality may be implemented by a different program, such as a different smart contract having a different address in the decentralized computing platform, from that for which data is to be pruned, e.g., one smart contract may prune data of another. In some embodiments, pruning functionality may be implemented external to a smart contract, for example, external to a smart contract while still within a runtime environment, like within a virtual machine upon which the smart contracts execute on peer nodes of the computing environment. In some embodiments, pruning is implemented with a program executing (e.g., synchronously or asynchronously relative to the virtual machine) external to the virtual machine, e.g., on host computing devices executing peer node application instances. Thus, in some embodiments, invocation of pruning may be independent of whether the smart contract for which data to be pruned is invoked, which is not to suggest that any other feature described herein is not also amenable to variation.

Some embodiments may determine whether pruning or other functionality of the smart contract has been invoked, as indicated by block 18. In some embodiments, this may include determining whether a program subroutine in which pruning functionality is implemented, like those examples above, has been called. In the case in which pruning functionality is part of the host smart contract, upon determining that pruning has not been invoked, embodiments may execute other instructions of the host smart contract. In some embodiments, this may include executing other subroutines or main functions of the smart contract. In some embodiments, generally requesting execution of instructions of smart contracts may be performed with transactions or other messages conveyed on the decentralized computing platform. The terms transmitting and conveying and the like, in the context of decentralized computing platforms, do not necessarily require that the transmitter and the receiver be in different physical locations. Rather, one account physically represented in data stored on every node (or a subset with a designated role the includes such storage) of a computing platform may transmit a transaction to another account that is also physically represented in data also stored in every node on that computing platform. Thus, transmission may happen at the account layer without necessarily requiring that the sender and receiver be in different physical locations.

In some embodiments, the transaction by which the smart contract's functionality is invoked may be logged to the tamper-evident data store, as indicated by block 20, for example, in a set of nodes along a path of a transaction trie associated with a current block being composed, or in a leaf node of a Merkle tree. In some embodiments, the transaction may include a remote procedure call with arguments and an identifier of a subroutine of the smart contract being invoked, along with a unique identifier, like an address of the smart contract that distinguishes the smart contract from other smart contracts deployed to the platform, and an address of the invoking entity in the decentralized computing platform.

In some embodiments, the decentralized computing platform may execute the invoke functionality of the smart contract, as indicated by block 22. In some embodiments, this may include determining whether the invoking party has authority to modify program state of the smart contract in a subspace of a domain described below with reference to FIG. 5 before determining to execute the invoked functionality. In some embodiments, executing the invoked functionality may cause the program state of the smart contract to evolve from a first program state at a first time in the past to a second program state produced by executing the invoked functionality. Examples include changing a balance of a number of ERC-20 (e.g., fungible, rivalrous) cryptographic tokens (or other digital bearer assets) in an account, determining whether signatures in an escrow transaction have been received, creating or otherwise modifying non-fungible cryptographic assets (like an ERC 721, e.g., non-fungible, rivalrous cryptographic token), or the like. Program state may include values of variables, the state of which affect branching in program flow of the smart contract or other smart contracts. Program state may include values for a variety of different types of variables, ranging from integers, Boolean values, the string values, or the like, and program state may include more feature-rich data structures, like binary large objects (blobs), dictionaries, lists, arrays, and the like. The values attributed to these items may serve as program state, and program state may evolve over time as those values change in virtue of execution of the smart contract. Some program state may be local to a subroutine, some program state may be local to a smart contract but accessible to each subroutine (e.g., global within the context of the smart contract but local within the context of the decentralized computing platform. Some program states may be global with respect to a subspace, domain, or the decentralized computing platform, with the former two examples being local with respect to other subspaces or other domains.

In some embodiments, program state may include ephemeral program state and persistent program state, the latter surviving between instances in which the smart contract is invoked, while the former may be discarded between invocations in some cases, for instance, with a garbage collection routine of a virtual machine upon which the smart contract executes. In some embodiments, ephemeral program state may be stored in a storage trie, a root cryptographic hash of the storage trie may be stored (e.g., as key-value pairs that map variable names to the values they bear) in a storage root field of an entry in a state trie corresponding to the invocation instance of the smart contract, as described in greater detail below with reference to FIGS. 3A and 3B.

Some embodiments may append an update to program state to the tamper-evident data store, as indicated in block 24, during or after execution of the smart contract. In some embodiments, this may include updating records corresponding to accounts of different entities having addresses on the decentralized computing platform. In some embodiments, the update may include updating a state trie to indicate an instance in which the smart contract was invoked and to add a pointer to a previous instance in which the smart contract was invoked, as described in greater detail below. In some embodiments, the update may further include the update to the state trie described above including the storage root value for the storage trie, and in some cases this may include corresponding updates to a receipts trie and a transaction trie as described below in reference to FIGS. 3A and 3B. In some embodiments, these updates may be rendered tamper evident with a graph of one-way function computations based upon the updates, for example, in an acyclic directed graph of cryptographic hash pointers or nested ciphertexts where one ciphertext contains a plurality of ciphertexts, which each contain still more ciphertexts of values rendered tamper evident.

Acyclic directed graphs of cryptographic hash pointers may take a variety of forms, including linked lists, skip lists, tries, and combinations thereof. In some embodiments, the graph is in an associative data structure. In some embodiments, the graph includes a plurality of nodes having content. In some embodiments, a subset of the nodes of the graph or all nodes may have content being rendered tamper evident, and a subset of nodes may have content based upon cryptographic hashes of other nodes linked to that respective node by a directed edge, like a pointer to a node having content upon which the cryptographic hash is based. Examples include a cryptographic hash of the content of an adjacent node in the graph and a timestamp. In some embodiments, the graph may be structured to afford a relatively fast access to individual entries, for example with a skip list having nodes with content that each correspond to a respective trie, like a radix trie or Merkle tree.

A variety of different types of cryptographic hash functions may be used. Examples include SHA-2, SHA-3, BLAKE2, or the like. In some cases, the cryptographic hash function deterministically maps an input of arbitrary length to a fixed-length output with a one-way function. In some embodiments, the hash function is based on a Merkle-Damgård construction, or some embodiments may avoid this architecture to mitigate risk of length extension attacks. In some cases, the fixed-length output is greater than or equal to 4 bytes, 8-bytes, 16-bytes, 32-bytes, 64-bytes, 128-bytes, 256-bytes, 512-bytes, or 1028-bytes.

In some embodiments, before, during, or after invoking the smart contract, some embodiments may include executing a cryptographic proof of membership, as indicated by block 26, to verify the absence of tampering. In some embodiments, this may include verifying the absence of tampering of a designated entry in the tamper-evident data store, for example, at a designated set of nodes along a path of a radix trie. Some embodiments may recompute the cryptographic hash values of a sequence of nodes of cryptographic hash pointers along a path terminating in the designated entry and confirm that the cryptographic hash values correspond to those produced by the designated entry. Upon detecting that the cryptographic hash values produced by the current entry do not correspond to those present in the directed acyclic graph, some embodiments may determine that tampering has occurred and emit an alarm or block a transaction. Alternatively, upon determining that the cryptographic hash values match those currently present in the directed acyclic graph, some embodiments may determine that tampering has not occurred and permit a transaction to complete or emit a confirmation event.

Some embodiments may return to block 16 to await the next invocation of a smart contract. Upon determining in block 18 that a pruning subroutine has been invoked, some embodiments may proceed to prune a creation transaction (e.g., a message to deploy a smart contract) from the tamper-evident data store, as indicated by block 28. Before pruning, some embodiments may determine whether rate limiting criteria are satisfied to mitigate attacks overwriting excessive amounts of data or more data than is permissioned. For instance, some embodiments may determine that less than a threshold amount of data has been pruned by a given account within less than a threshold duration of time before proceeding to pruning. In response to detecting that such thresholds have been exceeded, some embodiments may terminate the pruning operation and emit an alarm event.

As noted, pruning may take a variety of different forms, including deleting, overwriting, replacing within a null value, and de-indexing, for instance by removing a pointer to the entry in an authoritative data structure by which the entry is associated with a smart contract, address of an entity invoking the smart contractor creating the smart contract, or instance of invocation of the smart contract. In some cases, all program state is pruned, just program state of a given invocation of the smart contract, just program state of a given sub-routine, just program state of a given invocation of the given subroutine, or just program state from transactions issued by a given account, for example.

In some embodiments, pruning includes replacing the pruned entry with a value that designates the entry as having been pruned, like a reserved term in a namespace of the decentralized computing platform. In some embodiments, when verifying the cryptographic proof of membership in block 26, the value designating that the entry has been pruned may be detected, and in response, downstream cryptographic hash values may be determined consistent with the state of the entry even though those downstream cryptographic hash values are not produced based on the current entry. In some embodiments, a designated path through the directed acyclic graph of cryptographic hash pointers may be permitted to be internally inconsistent with a designated entry that was pruned while still being classified as satisfying a cryptographic proof of membership. In some embodiments, other leaf nodes in the same Merkle tree, if changed, may still cause the Merkle proof to fail and indicate tampering. Similarly, if a pruned node in the Merkle tree is changed to have a value other than that indicating it was pruned, the Merkle proof may still fail, as that changed value is expected to be inconsistent with downstream cryptographic hash values in the directed acyclic graph, unless the value is changed back to its original, pre-pruned state. In some embodiments, the cryptographic proof of membership may be invoked by a corresponding opcode of a virtual machine, and in some cases, the code mapped to that opcode may be configured to detect values indicating pruning and modify the cryptographic proof of membership to disregard such values.

Some embodiments may prune updates to program state from the tamper-evident data store, as indicated by block 30, e.g., after the pruning event is emitted and the decentralized computing platform reaches consensus on the pruned state of the contract. In some embodiments, this may include traversing a linked list or other graph of instances in which the smart contract was invoked by a transaction and pruning entries documenting those invocations. In some embodiments, each time a smart contract is invoked, a new entry may be made to a state trie, and that new entry may include a pointer to a previous entry. Some embodiments may traverse each of these entries, following the various pointers to prune each of a plurality of different invocations records. In some embodiments, each entry in the state trie may further include pointers to entries in transaction tries, receipt tries, and storage tries corresponding to changes in program state at the invocation, and some embodiments may crawl these various other sets of pointers to prune the corresponding entries in receipts tries, transaction tries, and storage tries.

In some embodiments, a smart contract may create or invoke a set of smart contracts, and those smart contracts may create or invoke another set of smart contracts, and so on, in a creation graph or call graph. Some embodiments may crawl this creation graph or call graph, for example with a recursive search, like a depth first or breadth first search. Some embodiments may, at each visited node of the creation graph or call graph, execute the pruning operations described with reference to block 28 and 30 for a linked list of invocations of that corresponding smart contract.

Some embodiments may emit a pruning event and logged pruned state of the smart contract, as indicated by block 32, for instance upon completing pruning a smart contract, completing pruning an invocation of a smart contract, or completing or starting pruning of an entry in program state in that invocation. In some embodiments, the process may return to block 12 awaiting the creation of another smart contract, and operation which may be ongoing concurrently as a given creator or other creators may continue to create new smart contracts while a given smart contract is deployed and in use and un-pruned. In some embodiments, after pruning, a given smart contract may be rendered un-invokable and otherwise inaccessible. In some embodiments, logged or otherwise preserved data may be exported to a relational database, and such exports may indicate which entries were pruned.

Figure 2:
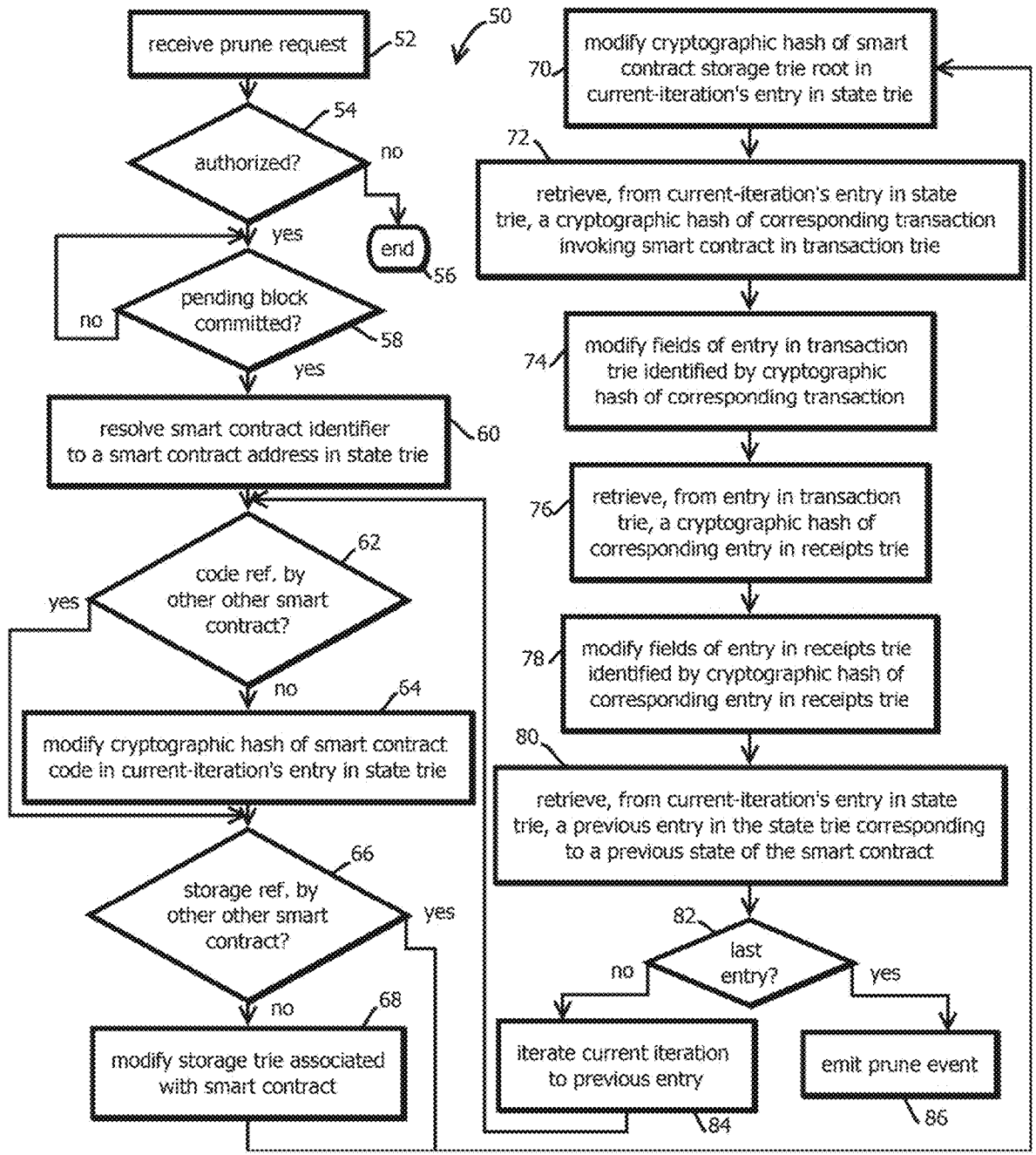
FIG. 2 is a flowchart depicting an example of a process by which pruning may be implemented in a decentralized computing platform, in accordance with some embodiments of the present techniques.

FIG. 2 shows an example of a process 50 by which pruning may be implemented, for example, in the program flow of FIG. 1, though it should be emphasized that implementations are not limited to that arrangement, which is not to suggest that any other feature described herein is required in all embodiments. In some embodiments, like the process of FIG. 1, the process 50 is executed by a decentralized computing platform implementing instructions in a smart contract subject to pruning, or in some cases the process of FIG. 2 is implemented by a virtual machine of a decentralized computing platform without regard to whether a smart contract subject to pruning includes printing instructions. Or in some embodiments, the process of FIG. 2 is executed by other program code executing on peer nodes of an application-layer peer-to-peer network of a decentralized computing platform.

Some embodiments include receiving a prune request, as indicated by block 52. In some embodiments, this is a request to a pruning subroutine of a smart contract subject to pruning. In some embodiments, the request identifies an address of the smart contract in the decentralized computing platform. In some embodiments, the request identifies a subset of current or historical program state of that smart contract to be pruned, e.g., implicitly indicating that other program state is to remain unaltered. A prune request need not be labeled as such in programs code, provided that the effect is to cause pruning, which is not to suggest that other constructs must be labeled in program code to match the terms used herein.

Some embodiments may determine whether the prune request is authorized, as indicated by block 54. In some embodiments, this may include determining whether an address or cryptographic signature associated with the prune request, for instance, in a transaction requesting pruning associated with a record indicating that the entity has authority to prune the specific data at issue, for example, in the domains and subspaces described below with reference to FIG. 5. Upon different determining that the request is not authorized, some embodiments may proceed to block 56, and determined not to implement the pruning that was requested.

Upon determining that pruning is authorized, some embodiments may proceed to determine whether a pending block has been committed, for instance, to a blockchain. In some embodiments, the pruning operation may be executed synchronously between block commits. Upon determining that it has not, some embodiments may continue waiting. Upon determining that the pending block has been committed, some embodiments may proceed to the next operation, and in some cases set a flag that another block should not be committed until the operation of process 50 are complete. Or some embodiments may prune asynchronously relative to block creation, which is not to suggest that other features are not also amenable to variation.

Some embodiments may resolve a smart contract identifier in the request to a smart contract address in a state trie, as indicated by block 60. In some embodiments, this operation may include accessing a local domain name system or other index that maps smart contract identifiers in a local namespace to addresses of smart contracts in the decentralized computing platform.

Some embodiments may then interrogate records associated with the smart contract address in the tamper-evident data store. In some embodiments, this may include determining whether code of the smart contract, like various functions or variables therein, are referenced by other smart contracts, as indicated by block 62. Upon determining that it is not, some embodiments may proceed to modify a cryptographic hash of smart contract code in a current iteration's state trie, as indicated by block 64, such as in the state trie described below with reference to FIGS. 3A and 3B, like an entry in a state trie corresponding to a most recent invocation of the smart contract. Modification may take a variety of different forms, including the types of pruning described above. In block 62, upon determining that code of the smart contract is referenced by another smart contract, some embodiments may then proceed to block 66, which may merge with the program flow leaving block 64.

Some embodiments may include determining whether storage of the smart contract (e.g., any subset of the storage), like in a storage trie, is referenced by another smart contract, as indicated by block 66. Upon determining that it is not, some embodiments may modify the storage trie associated with the smart contract, as indicated by block 68. Again, modification may take a variety of forms, including the types of pruning described above. In some embodiments, modification may include garbage collection of a virtual machine executing the smart contract designating memory occupied by the storage trie as being open for being overwritten and de-indexing those entries in a filesystem. In block 66, upon determining that storage of the smart contract is not referenced by another smart contract, program flow may merge with that leaving block 68, and proceed to subsequent operations.

Some embodiments may include modifying a cryptographic hash of a smart contract storage trie root in a current iteration's entry in a state trie, as indicated by block 70. Again, modification may take a variety of forms, including the types of pruning described above. An example of a smart contract storage trie root of a current iteration is described below with reference to FIGS. 3A and 3B.

Some embodiments may include retrieving, from a current iteration's entry in a state trie, a cryptographic hash of a corresponding transaction invoking the smart contract in the transaction trie, as indicated by block 72. Some embodiments may use this retrieved value to identify (e.g., as a pointer to) other entries to be pruned.

Some embodiments may then modify fields of the identified entry in the transaction trie, as indicated by block 74. In some embodiments, modification may include the various types of pruning operations described above.

Some embodiments may include retrieving, from the entry in the transaction trie that was identified, a cryptographic hash of a corresponding entry in a receipts trie, as indicated by block 76. This entry may be used as an index into another portion of the tamper-evident data store.

Some embodiments may then modify fields of the entry in the receipts trie identified by the cryptographic hash obtained in block 76. Modification again may take any of the various forms of pruning described above.

Some embodiments may retrieve, from the current iteration's entry in the state trie, a previous entry in the state trie corresponding to a previous state of the smart contract at a previous time, as indicated by block 80. Some embodiments may determine whether a current entry is a last entry, as indicated by block 82. Upon determining that it is not, some embodiments may iterate the current iteration to the previous entry, as indicated by block 84, and traverse backwards in time through a linked list of invocations of the smart contract, pruning designated entries along the way, by returning to block 62. Alternatively, upon determining that the final entry has been reached, some embodiments may emit a prune event, as indicated by block 86. In some embodiments, pruning values associated with the final entry may include pruning a creation transaction by which the smart contract is created in a transaction trie, as discussed above. As a result, later arriving peer nodes, when synchronizing by playing back logged transactions, may not obtain access to the pruned data, even temporarily in some cases before playing back a pruning transaction. In some embodiments, synchronizing may include synchronizing and reconciling state updates to blocks' states, without relaying the transactions to create those states.

Figure 3A:
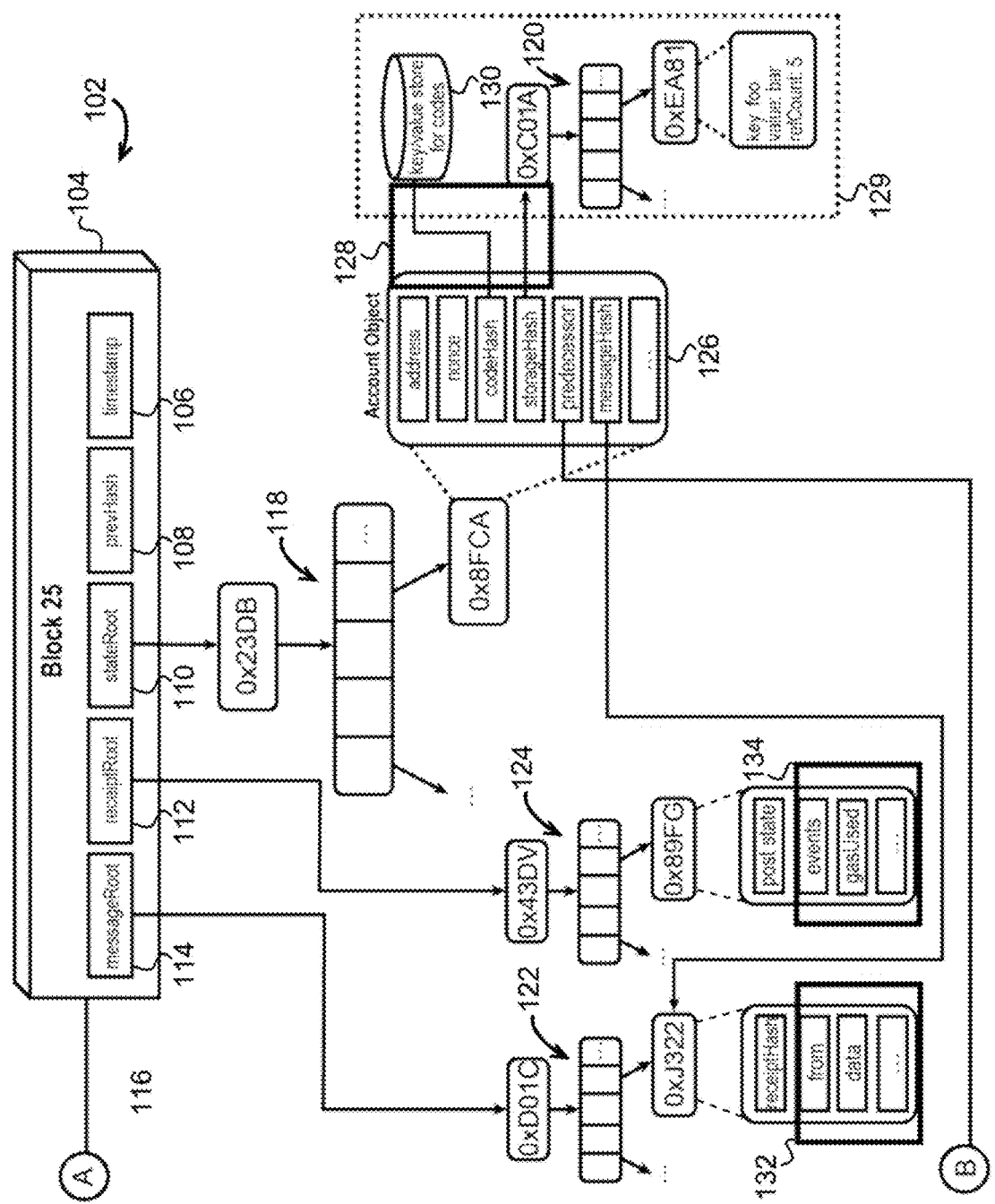
FIGS. 3A and 3B are schematic diagrams of an example of a tamper-evident data store in which pruning may be applied, in accordance with some embodiments of the present techniques.
Figure 3B:
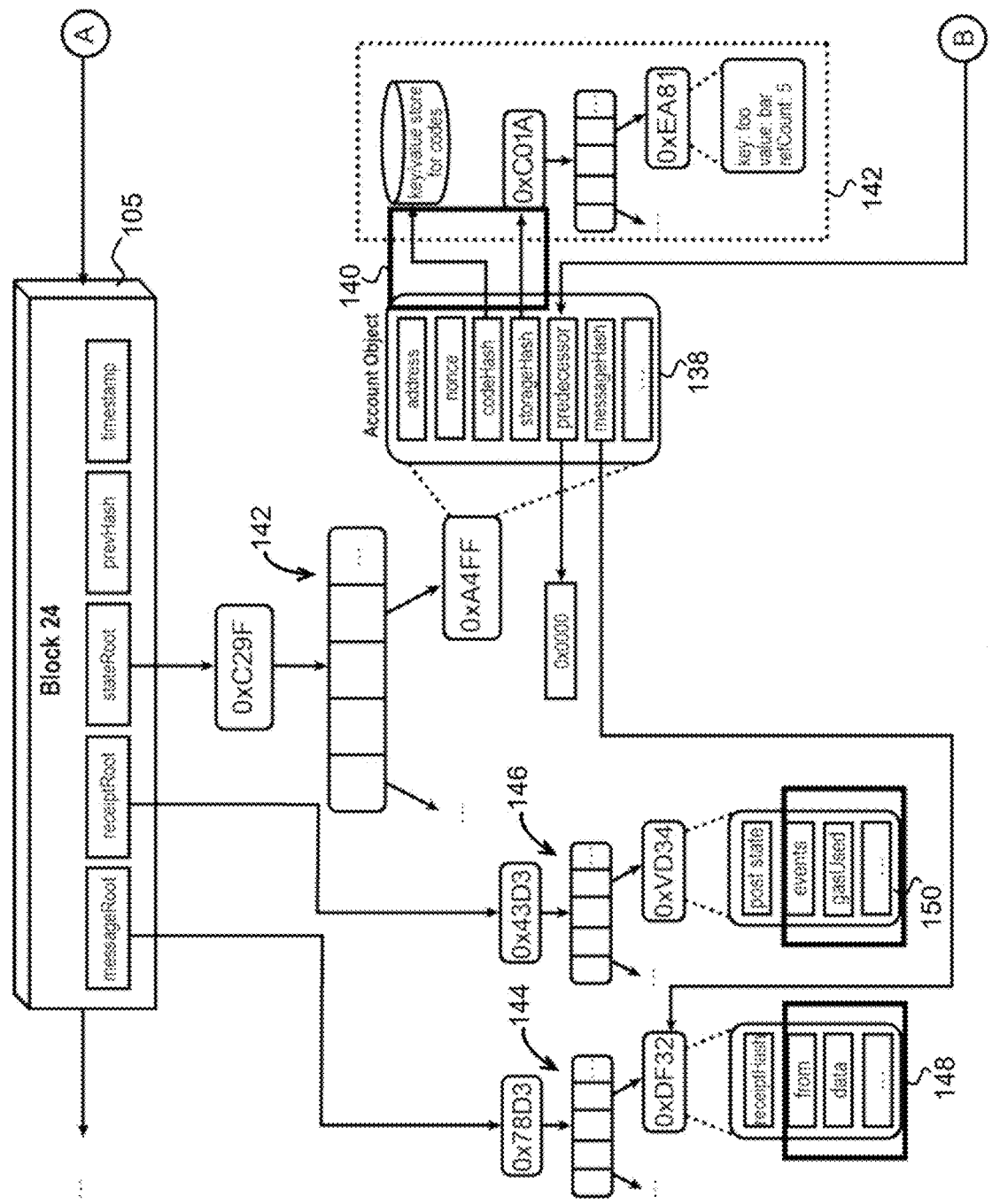

FIGS. 3A and 3B are block diagrams illustrating an example of a tamper-evident data store that may be modified with the above-described pruning operations. In some embodiments, the tamper-evident data store may be a distributed ledger, like a blockchain, such as those of the above-described blockchain-based computing platforms. FIGS. 3A and 3B depict a sequence of blocks in a blockchain and related tries of cryptographic hash pointers having root hashes stored in those respective blocks. The illustrated arrows correspond to pointers (e.g., cryptographic hash), and the letters with circles labeled A and B illustrate where the two data structures are joined by cryptographic hash pointers or other pointers. In the illustrated example, the blocks are consecutive, but in many commercial embodiments, it is expected that data from invocation of a given smart contract may skip several blocks between invocation. In the illustrated example, a tamper-evident data store 102 includes a linked list of blocks 104 and 105 connected by cryptographic hash pointers. In this example, the block 104 may be created later in time than the block 105.

In some embodiments, the data store 102 may be characterized as a directed acyclic graph of cryptographic hash pointers. A subset of nodes of the directed acyclic graph may form a linked list or skip list, such as those nodes labeled as blocks 104 and 105. In some embodiments, each node of this list may include as content a plurality of values, including a timestamp of when the respective block was created, a cryptographic hash of content of the previous node pointed to by an edge connecting those nodes 108, a root value 110 of a trie of cryptographic hash values referred to as a state trie 118, a cryptographic hash 112 that is a root value of a trie 124 of cryptographic hash values referred to as a receipt trie, and a cryptographic hash value 114 that is a root value of a trie of cryptographic hash values referred to as a transaction trie 122. In some embodiments, each block 104 and 105 may have three or more tries directly connected thereto by cryptographic hash pointers corresponding to root values of respective tries a cryptographic hash values, for example, Merkle roots.

In some embodiments, the state trie 118 may include a plurality of levels of cryptographic hash pointers that fan out from a root to leaf nodes through 2, 3, 4, 5, 6, or more hierarchical levels of branching. In some embodiments, leaf nodes may each correspond to an account address of a smart contract or instance of invocation thereof. In some embodiments, such leaf nodes (or paths thereto) of the state trie 118 may include the fields 126 shown in FIG. 3A. The address may be an address of the smart contract or instance of invocation, the nonce value may be a count of the number of times the smart contract has been invoked, the code hash value may be a cryptographic hash of bytecode representation of the smart contract 130, the storage hash may be a Merkle root of a trie of cryptographic hash pointers 120 storing key-value pairs encoding program state of the smart contract that is ephemeral between instances of invocation. In some embodiments, the fields include a predecessor pointer that points to a previous entry in an entry in an earlier state trie corresponding to a previous invocation of the smart contract and a cryptographic hash of a transaction in which the smart contract was invoked, which may be an address of an entry in the transaction trie 122.

In some embodiments, pruning may include pruning a subset of entries, including the code hash value and the storage hash values, as indicated by block 128 designating a subset of entries to be pruned.

In some embodiments, the transaction trie 122 similarly includes a plurality of levels of cryptographic hash pointers that fan out from a root node to leaf nodes, paths to which corresponding to individual transactions by which smart contracts are invoked or deployed. Leaf nodes may include is content a plurality of fields, including a cryptographic hash value of an entry in the receipt trie 124 corresponding to a record documenting consumption of a cryptographic tokens by which usage of computation of the decentralized computing platform are metered, such as gas in Ethereum or any other suitable technique for metering usage or any combination thereof. In some embodiments, the entry corresponding to the transaction trie leaf node further includes a from field indicating an address or other identifier of an entity from which the transaction was sent and data specifying the transaction, for example, indicating which subroutine is invoked and arguments thereof, along with an address of the smart contract being invoked.

In some embodiments, the entries 132 including the entry indicating who issued the transaction and the data of the transaction may be pruned, as indicated by the designation of block 132.

In some embodiments, the receipt hash of the entry in the transaction trie 122 may identify a set of nodes along a path in the receipt trie 124 documenting consumption of a cryptographic token attributable to the corresponding transaction. In some embodiments, the entries designated by block 134 may be subject to pruning, including logged event emitted and records of gas used by the transaction.

In some embodiments, as discussed above, entries in the state trie of a given block may include pointers to previous entries corresponding to previous invocations of a given smart contract, as connected by the circle with the letter B between FIGS. 3A and 3B. In some embodiments, the predecessor pointer may identify entry 138 in earlier block 105's state trie, and entries 140 may be subject to pruning, along with data 142 which may be subject to garbage collection or explicit pruning, along with data and block 129 which may also be subject to garbage collection pruning or explicit pruning. In this example, the predecessor entry for leaf node 138 points to an empty address, indicating the end of a sequence and the initial deployment of the smart contract to the decentralized computing platform. A similar set of entries may be pruned from tries 142, 146, and 144, corresponding to a state trie, a receipt trie, and a transaction trie respectively like those discussed above. In some embodiments, this may include pruning the fields designated with boxes 148 and 150 from corresponding entries in the set of nodes along paths of the transaction trie and receipt trie 144 and 146 respectively.

Figure 4:
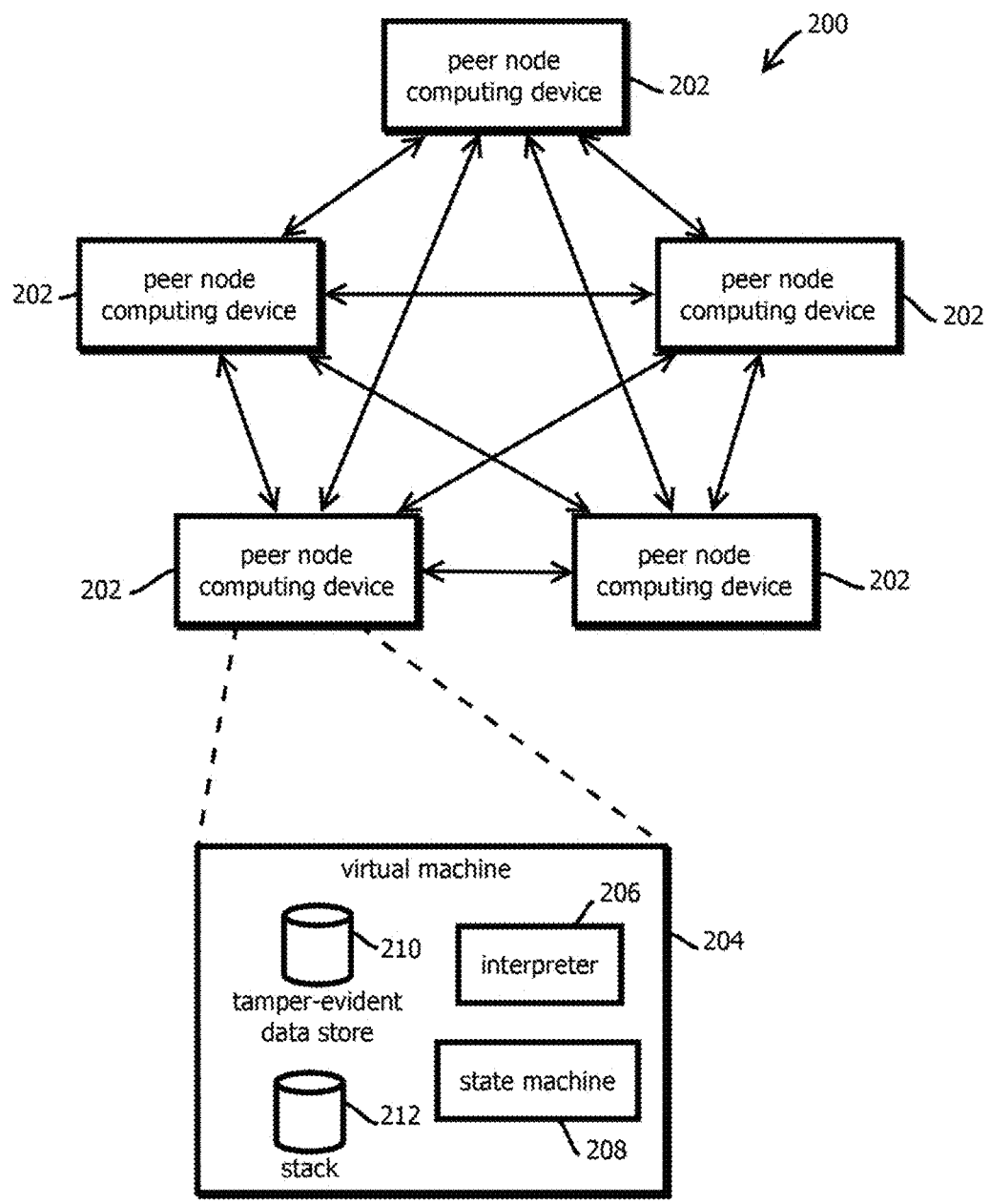
FIG. 4 is a physical and logical architecture block diagram of an example of a decentralized computing platform in which the data store of FIGS. 3A and 3B and processes of FIGS. 1 and 2 may be implemented, in accordance with some embodiments of the present techniques.

FIG. 4 illustrates an example physical and logical architecture of a decentralized computing platform 200. In some embodiments, there may be no centralized authority exercising control of the computing platform, and computing may be implemented through ad hoc cooperation of a plurality of different peer computing node applications 202 executing on different computing devices, or in some cases, a plurality of different peer node applications may execute on a single computing device, for example, in different virtual machines or containers. In some embodiments, the decentralized computing platform 200 is a permissionless (e.g., public) computing platform in which anyone with access to program code of the peer node application may participate by installing and executing the application. In some embodiments, the decentralized computing platform may be a private decentralized computing platform, such as one in which peer computing nodes authenticate themselves to the other computing nodes by demonstrating possession of a private cryptographic key associated with a permissioned tenant of the blockchain computing platform 200. Five peer computing nodes 200 are shown, but commercial embodiments are expected to include substantially more, for instance, more than 10, more than 100, or more than 1000. In some embodiments, a plurality of tenants may have authentication credentials entitling their peer nodes to participate, such as more than 2, more than 5, more than 10, or more than 100 tenants. In some embodiments, peer computing nodes may be co-located or geographically distributed, for instance, executing on different data centers or different on-premises collections of computing hardware.

In some cases, different subsets of the peer nodes 202 may have different roles and permissions. In some cases, some of the peer nodes 202 may operate as validators having access to, for instance, all of the data in a domain like those described below with reference to FIG. 5. In some cases, validator peer nodes may participate in consensus determinations and execute smart contracts. Observer peer nodes may have fewer privileges, e.g., the right to access data in a domain or subspace, without participating in consensus or executing smart contracts. In some cases, a given peer node 202 may be a validator in one domain and an observer in another.

In some embodiments, each peer computing node 200 may execute an instance of a virtual machine 204, such as the Ethereum virtual machine or the eWASM (Ethereum web assembly) virtual machine. In some embodiments, the virtual machine is operative to execute bytecode encoding a set of opcodes of the virtual machine. In some cases, smart contracts written in source code may be interpreted to bytecode, which the virtual machine 204 may then compile to machine code suitable for the underlying computing hardware, abstracting away differences in processors and other hardware from developers. In some embodiments, the virtual machine 204 may be identical on each of the peer computing nodes 202. In some embodiments, the virtual machine may include an interpreter 206 configured to interpret source code into bytecode, a state machine 208 configured to execute smart contracts and update state of the smart contract stored in a tamper-evident data store 210. In some embodiments, some ephemeral state of the smart contracts during execution may be stored in a stack data structure 212 of the virtual machine 204, and other ephemeral state may be stored in random access memory allocated by the virtual machine to the smart contract's process. In some cases, different opcodes may have different has costs allocated thereto by the virtual machine, which may tally gas costs of execution and update records in the receipts trie to indicate gas consumption. In some embodiments, the virtual machine 204 may be configured to respond to an opcode corresponding to a pruning instruction by which pruning is implemented, as some existing examples of virtual machines of decentralized computing platforms generally do not support pruning operations.

Figure 5:
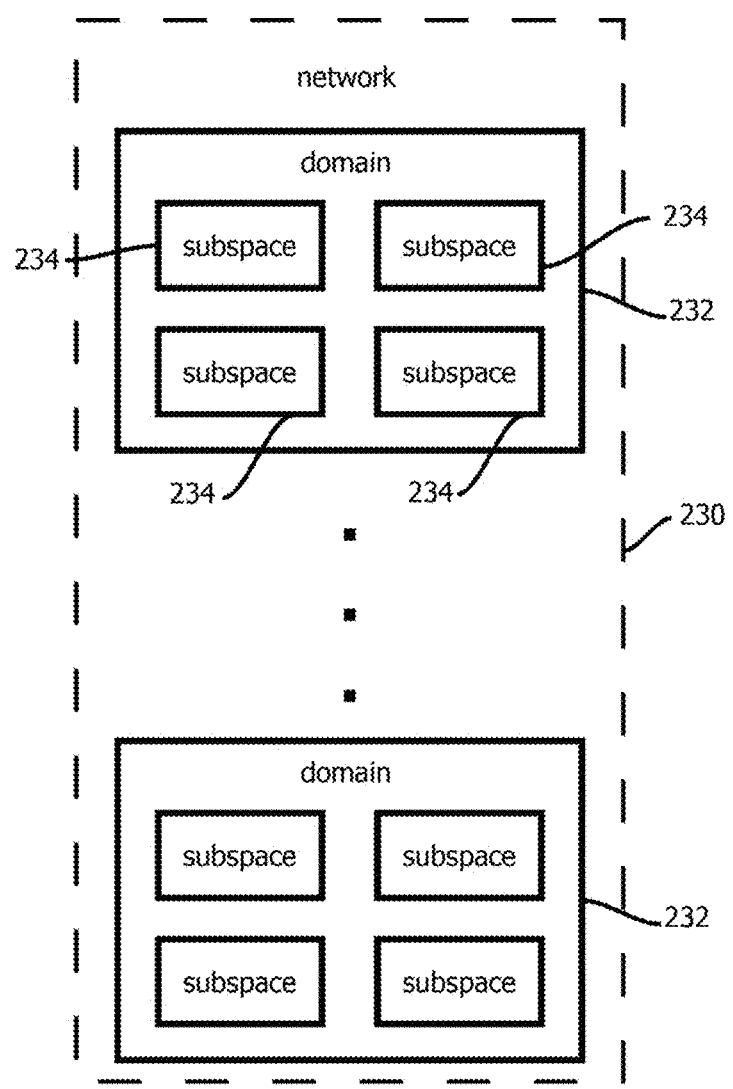
FIG. 5 is a block diagram depicting access and privacy controls that may be implemented by the decentralized computing platform of FIG. 4, in accordance with some embodiments of the present techniques.

FIG. 5 depicts an example of a privacy and permissioning data model that may be implemented with the above-described data stores and decentralized computing platforms. In some embodiments, different peer nodes have different roles, and some cases with some peer nodes being responsible for determining consensus, will and other peer nodes merely being able to interrogate the results of computations. In some embodiments, a subset of the peer nodes (like validator nodes) may govern access of various forms by other nodes (like observer nodes) to the data stored in the decentralized computing platform, including the ability to prune entries. In some embodiments, roles and permissions of various tenants and user accounts therein may be mapped to different domains 232 and different sub spaces 234 therein, such that a given tenant or given user of a given tenant may be permitted to engage in, or prevented from, viewing, writing, or pruning entries in a given domain 232 or subspace 234 thereof. In some embodiments, the domain 232 and subspace mappings 234 may be overlaid on the same tamper-evident data structure, such that different entities may have different types of access to different subsets of that data structure. Or in some cases, privacy and access control may be implemented with other data models, like channels in Hyperledger implementations.

Figure 6:
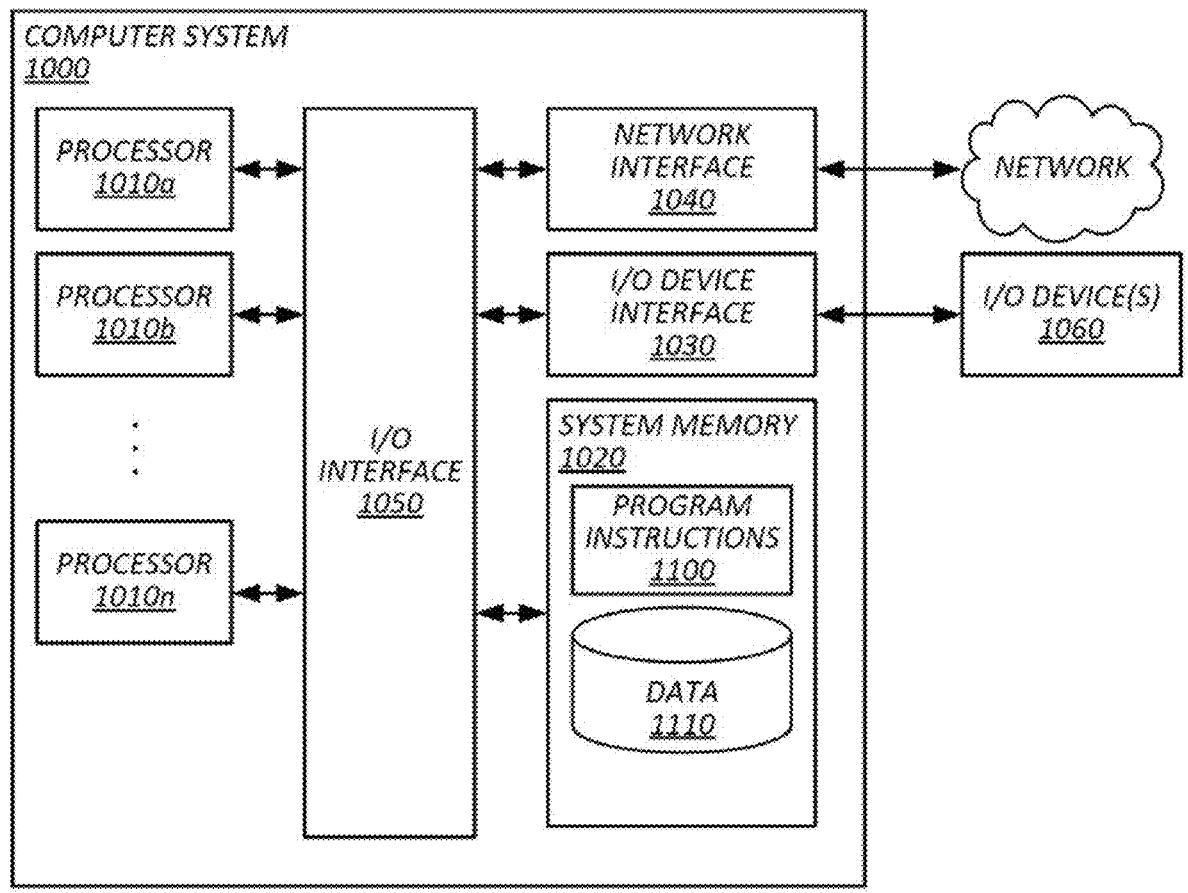
FIG. 6 is a block diagram depicting an example of a computing device by which the above techniques may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: receiving, with a computer system, a request to prune data stored in a tamper-evident data store, wherein: the data includes first program state of a first program at a first time, the first program is one of a plurality of programs having program state stored in the tamper-evident data store, the request uniquely identifies the first program with an identifier that distinguishes the first program from a second program among the plurality of programs, the tamper-evident data store comprises a directed acyclic graph of cryptographic hash pointers, a first subset of the cryptographic hash pointers have cryptographic hash values based on the first program state of the first program at the first time, a second subset of the cryptographic hash pointers have cryptographic hash values based on second program state of the first program at a second time, a third subset of the cryptographic hash pointers have cryptographic hash values based on the first program state of the first program at the first time, the second program state of the first program at the second time, and program state of the second program from before the first time, and the tamper-evident data store comprises or is associated with a record that links the first subset of the cryptographic hash pointers to the second subset of the cryptographic hash pointers; in response to the request, based on the identifier and the record that links the first subset of the cryptographic hash pointers to the second subset of the cryptographic hash pointers, with the computer system, selecting: a first subset of nodes of the directed acyclic graph having first content based on the first program state of the first program at the first time, the hash values of first subset of the cryptographic hash pointers being based on the first content, and a second subset of nodes of the directed acyclic graph having second content based on the first program state of the first program at the first time, the hash values of second subset of the cryptographic hash pointers being based on the second content; pruning, with the computer system, the first program state and the second program state from the tamper-evident data store by changing the first content and the second content in memory, wherein: after the pruning, cryptographic hash values of the directed acyclic graph of cryptographic hash pointers are internally consistent, and after the pruning, program state of second program from before the first time remains in the tamper-evident data store.

2. The medium of embodiment 1, wherein: receiving comprises receiving an invocation of a subroutine of the first program sent to an address of the first program on a permissioned decentralized computing platform configured to persist state to the tamper-evident data store; the address is based on an address of a creator of the first program and a count of programs previously deployed by the creator; the subroutine, upon being interpreted to bytecode, invokes a pruning opcode of a virtual machine, upon replicated instances of which virtual machine the first program is redundantly executed on a plurality of computing nodes of the decentralized computing platform; the record comprises a linked list of nodes in the tamper-evident data store based on program state of the first program at different times; the first content comprises a cryptographic transaction hash of a transaction on the decentralized computing platform by which the first program was deployed; pruning comprises changing the cryptographic transaction hash of the transaction on the decentralized computing platform by which the first program was deployed; the second content comprises a cryptographic storage hash based on a root node of first trie of cryptographic hash pointers having program state of the first program but not the second program; pruning comprises changing the cryptographic storage hash; the second content comprises a transaction by which the first program was invoked to mutate program state of the first program from the first program state to the second program state; the transaction is stored in a second trie of cryptographic hash pointers, the second trie of cryptographic hash pointers having transactions with programs among the plurality of programs other than the first program; and pruning comprises changing, in the second trie of cryptographic hash pointers, the transaction by which the first program was invoked to mutate program state of the first program from the first program state to the second program state.

3. The medium of embodiment 1, wherein: pruning comprises de-indexing entries in the tamper-evident data store and designating entries as having been pruned in the tamper-evident data store.

4. The medium of any one of embodiments 1 and 3, wherein pruning comprises: iterating through each instance of program state of the first program, including the first program state and the second program state and, at each of at least a plurality of iterations: in a current-iteration entry in a state trie, changing a current-iteration cryptographic code hash value based on code of the first program; in the current-iteration entry in a state trie, changing a current-iteration cryptographic storage hash value based on data stored by the first program; changing values other than a current-iteration cryptographic receipt hash in a current-iteration transaction entry identified by a cryptographic transaction hash in the current-iteration entry in the state trie; changing values in an entry in a receipt trie identified by the current-iteration cryptographic receipt hash; and accessing a current-iteration pointer to a predecessor entry in a state trie.

5. The medium of any one of embodiments 1 and 3-4, wherein pruning is executed synchronously between instances in which transaction tries are added to the directed acyclic graph of cryptographic hash pointers.

6. The medium of any one of embodiments 1 and 3-5, the operations comprising synchronizing a new computing node with a network of computing nodes storing the tamper-evident data store by chronologically executing a history of transactions stored in the tamper-evident data, wherein synchronizing comprises: determining that a first transaction has not been pruned, and in response, executing the first transaction; and determining that a second transaction has been pruned, and in response, not executing the second transaction.

7. The medium of any one of embodiments 1 and 3-6, wherein: bytecode of the first program remains in the tamper-evident data store after pruning.

8. The medium of any one of embodiments 1 and 3-7, the operations comprising: before pruning and after receiving the request, determining that an amount of pruning within a threshold duration of time is less than a threshold.

9. The medium of any one of embodiments 1 and 3-8, the operation comprising: before pruning and after receiving the request, determining that an entity requesting pruning is authorized to cause the pruning based, in part, on which data is requested to be pruned.

10. The medium of any one of embodiments 1 and 3-9, wherein pruning comprises: changing local copies of the tamper-evident data store on each of a plurality of computing nodes of a decentralized computing platform with a local instance of a virtual machine executing at least part of the first program.

11. The medium of embodiment 10, wherein the at least part of the first program invokes an opcode of the virtual machine, the opcode being configured to receive as an argument an address of a smart contract to be pruned.

12. The medium of embodiment 11, wherein the opcode is configured to cause an event indicating pruning to be emitted during execution, the event including an identifier of the first program.

13. The medium of any one of embodiments 1 and 3-12, wherein pruning comprises determining that pruned data is not referenced by another program among the plurality of programs.

14. The medium of any one of embodiments 1 and 3-13, wherein pruning comprises recursing a graph of programs created by the first program or through programs crated by the first program and pruning data of programs in the graph of programs from the tamper-evident data store.

15. The medium of any one of embodiments 1 and 3-14, wherein: the tamper-evident data store comprises a plurality of channels; and the plurality of programs execute on decentralized computing platform that persists program state to the tamper-evident data store in association with corresponding ones of the channels and prevents cross-channel access to stored data.

16. The medium of any one of embodiments 1 and 3-15, wherein: tamper-evident data store stores transactions in a relational database and renders transactions tamper-evident through multi-party cryptographic signatures based on content of the transactions.

17. The medium of any one of embodiments 1 and 3-17, the operations comprising: executing a third program that transfers a cryptographic token from a first account to a second account or associates an unspent transaction output including the cryptographic token with an address of a user.

18. A method, comprising: the operations of any one of embodiments 1-17.

19. A system, comprising: one or more processors; and memory storing instructions that when executed by the processors cause the processors to effectuate operations comprising: the operations of any one of embodiments 1-17.

What is claimed is:
1. A system, comprising:
a non-transitory memory; and
one or more hardware processors coupled to the non-transitory memory and configured to read instructions from the non-transitory memory to cause the one or more hardware processors to:
obtain instruction to prune data stored in a tamper-evident data store, wherein:
  the data includes a first program state of a first program at a first time,
  the first program is one of a plurality of programs having program state stored in the tamper-evident data store,
  the instruction identifies the first program with an identifier that distinguishes the first program from a second program among the plurality of programs,
  the tamper-evident data store comprises a directed acyclic graph of cryptographic hash pointers,
  a first subset of the cryptographic hash pointers have cryptographic hash values based on the first program state of the first program at the first time,
  a second subset of the cryptographic hash pointers have cryptographic hash values based on a second program state of the first program at a second time,
  a third subset of the cryptographic hash pointers have cryptographic hash values based on the first program state of the first program at the first time, the second program state of the first program at the second time, and a program state of the second program, and the tamper-evident data store comprises or is associated with a record that links the first subset of the cryptographic hash pointers to the second subset of the cryptographic hash pointers;

in response to the instruction and based on the identifier and the record that links the first subset of the cryptographic hash pointers to the second subset of the cryptographic hash pointers, select:
  a first subset of nodes of the directed acyclic graph having first content based on the first program state of the first program at the first time, the cryptographic hash values of the first subset of the cryptographic hash pointers being based on the first content, and
  a second subset of nodes of the directed acyclic graph having second content based on the second program state of the first program at the second time, the cryptographic hash values of the second subset of the cryptographic hash pointers being based on the second content; and prune the first program state and the second program state from the tamper-evident data store by pruning the first content and the second content, wherein:
  after the pruning, cryptographic hash values of the directed acyclic graph of cryptographic hash pointers are internally consistent, and
  after the pruning, the program state of the second program remains in the tamper-evident data store.

2. The system of claim 1, wherein:
the obtaining comprises receiving an invocation of a subroutine of the first program sent to an address of the first program on a permissioned decentralized computing platform configured to persist state to the tamper-evident data store;
the address is based on an address of a creator of the first program and a count of programs previously deployed by the creator;
the subroutine, upon being interpreted to bytecode, invokes a pruning opcode of a virtual machine, upon replicated instances of which virtual machine the first program is redundantly executed on a plurality of computing nodes of the permissioned decentralized computing platform;
the record comprises a linked list of nodes in the tamper-evident data store based on program state of the first program at different times;
the first content comprises a cryptographic transaction hash of a transaction on the permissioned decentralized computing platform by which the first program was deployed;
the pruning comprises changing the cryptographic transaction hash of the transaction on the permissioned decentralized computing platform by which the first program was deployed;
the second content comprises a cryptographic storage hash based on a root node of first trie of cryptographic hash pointers having program state of the first program but not the second program;
the pruning comprises changing the cryptographic storage hash;
the second content comprises a transaction by which the first program was invoked to mutate program state of the first program from the first program state to the second program state;
the transaction, by which the first program was invoked to mutate program state of the first program, is stored in a second trie of cryptographic hash pointers, the second trie of cryptographic hash pointers having transactions with programs among the plurality of programs other than the first program; and
the pruning comprises pruning, in the second trie of cryptographic hash pointers, the transaction by which the first program was invoked to mutate program state of the first program from the first program state to the second program state.

3. The system of claim 1, wherein:
the pruning comprises de-indexing entries in the tamper-evident data store and designating entries as having been pruned in the tamper-evident data store.

4. The system of claim 1, wherein the pruning comprises:
iterating through each instance of program state of the first program, including the first program state and the second program state and, at each of at least a plurality of iterations:
  in a current-iteration entry in a state trie, changing a current-iteration cryptographic code hash value based on code of the first program;
  in the current-iteration entry in a state trie, changing a current-iteration cryptographic storage hash value based on data stored by the first program;
  changing values other than a current-iteration cryptographic receipt hash in a current-iteration transaction entry identified by a cryptographic transaction hash in the current-iteration entry in the state trie;
  changing values in an entry in a receipt trie identified by the current-iteration cryptographic receipt hash; and
  accessing a current-iteration pointer to a predecessor entry in a state trie.

5. The system of claim 1, wherein the pruning is executed synchronously between instances in which transaction tries are added to the directed acyclic graph of cryptographic hash pointers.

6. The system of claim 1, wherein the instructions cause the one or more hardware processors to: synchronize a new computing node with a network of computing nodes storing the tamper-evident data store by chronologically executing a history of transactions stored in the tamper-evident data store, wherein the synchronizing comprises:
  determining that a first transaction has not been pruned, and in response, executing the first transaction; and
  determining that a second transaction has been pruned, and in response, not executing the second transaction.

7. The system of claim 1, wherein:
bytecode of the first program remains in the tamper-evident data store after pruning.

8. The system of claim 1, wherein the instructions cause the one or more hardware processors to:
before the pruning and after the obtaining the instruction, determine that an amount of pruning within a threshold duration of time is less than a threshold.

9. The system of claim 1, wherein the instructions cause the one or more hardware processors to:
before the pruning and after the obtaining the instruction, determine that an entity requesting pruning is authorized to cause the pruning based, in part, on which data is requested to be pruned.

10. The system of claim 1, wherein the pruning comprises:
changing local copies of the tamper-evident data store on each of a plurality of computing nodes of a decentralized computing platform with a local instance of a virtual machine executing at least part of the first program.

11. The system of claim 10, wherein the at least part of the first program invokes an opcode of the virtual machine, the opcode being configured to receive as an argument an address of a smart contract to be pruned.

12. The system of claim 11, wherein the opcode is configured to cause an event indicating pruning to be emitted during execution, the event including an identifier of the first program.

13. The system of claim 1, wherein pruning comprises determining that pruned data is not referenced by another program among the plurality of programs.

14. The system of claim 1, wherein pruning comprises recursing a graph of programs created by the first program or through programs by the first program and pruning data of programs in the graph of programs from the tamper-evident data store.

15. The system of claim 1, wherein:
the tamper-evident data store comprises a plurality of channels; and
the plurality of programs execute on decentralized computing platform that persists program state to the tamper-evident data store in association with corresponding ones of the channels and prevents cross-channel access to stored data.

16. The system of claim 1, wherein:
the tamper-evident data store stores transactions in a relational database and renders transactions tamper-evident through multi-party cryptographic signatures based on content of the transactions.

17. The system of claim 1, wherein:
the first program is a smart contract of a Turing-complete decentralized computing platform;
the Turing-complete decentralized computing platform executes the smart contract on a plurality of peer computing nodes; and
the plurality of peer computing nodes use means for determining consensus to determine a result of the smart contract execution.

18. The system of claim 1, wherein the instructions cause the one or more hardware processors to:
execute a third program that transfers a cryptographic token from a first account to a second account or associates an unspent transaction output including the cryptographic token with an address of a user.

19. The system of claim 1, wherein:
pruning comprises steps for pruning.

20. A tangible, non-transitory, machine-readable medium storing instructions that when executed by one or more processors effectuate operations, comprising:
obtaining, with a computer system, instruction to prune data stored in a tamper-evident data store, wherein:
the data includes a first program state of a first program at a first time,
the first program is one of a plurality of programs having program state stored in the tamper-evident data store,
the instruction identifies the first program with an identifier that distinguishes the first program from a second program among the plurality of programs,
the tamper-evident data store comprises a directed acyclic graph of cryptographic hash pointers,
a first subset of the cryptographic hash pointers have cryptographic hash values based on the first program state of the first program at the first time,
a second subset of the cryptographic hash pointers have cryptographic hash values based on a second program state of the first program at a second time,
a third subset of the cryptographic hash pointers have cryptographic hash values based on the first program state of the first program at the first time, the second program state of the first program at the second time, and a program state of the second program, and
the tamper-evident data store comprises or is associated with a record that links the first subset of the cryptographic hash pointers to the second subset of the cryptographic hash pointers;
in response to the instruction and based on the identifier and the record that links the first subset of the cryptographic hash pointers to the second subset of the cryptographic hash pointers, selecting, with the computer system:
a first subset of nodes of the directed acyclic graph having first content based on the first program state of the first program at the first time, the cryptographic hash values of first subset of the cryptographic hash pointers being based on the first content, and
a second subset of nodes of the directed acyclic graph having second content based on the second program state of the first program at the second time, the cryptographic hash values of second subset of the cryptographic hash pointers being based on the second content; and
pruning, with the computer system, the first program state and the second program state from the tamper-evident data store by pruning the first content and the second content, wherein:
after the pruning, cryptographic hash values of the directed acyclic graph of cryptographic hash pointers are internally consistent, and
after the pruning, the program state of the second program remains in the tamper-evident data store.

* * * * *